(12) United States Patent
Schrader et al.

(10) Patent No.: US 10,236,669 B2
(45) Date of Patent: Mar. 19, 2019

(54) MOTION CONTROL DEVICE FOR OVERHEAD TRANSMISSION LINES

(71) Applicants: Hubbell Incorporated, Shelton, CT (US); Gary Edward Schrader, Manchester, NH (US); Jeffery Lee Thomas, Aiken, SC (US); Peter Chan, Toronto (CA)

(72) Inventors: Gary Edward Schrader, Manchester, NH (US); Jeffery Lee Thomas, Aiken, SC (US); Peter Chan, Toronto (CA)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/750,693

(22) PCT Filed: Aug. 8, 2016

(86) PCT No.: PCT/US2016/046020
§ 371 (c)(1),
(2) Date: Feb. 6, 2018

(87) PCT Pub. No.: WO2017/027464
PCT Pub. Date: Feb. 16, 2017

(65) Prior Publication Data
US 2018/0233891 A1    Aug. 16, 2018

Related U.S. Application Data

(60) Provisional application No. 62/202,476, filed on Aug. 7, 2015.

(51) Int. Cl.
| | | |
|---|---|---|
| *H02G 7/12* | (2006.01) | |
| *H01B 17/44* | (2006.01) | |
| *H01B 17/56* | (2006.01) | |

(52) U.S. Cl.
CPC ............. *H02G 7/125* (2013.01); *H01B 17/44* (2013.01); *H01B 17/56* (2013.01)

(58) Field of Classification Search
CPC ...................................................... H02G 7/125
(Continued)

(56) References Cited

U.S. PATENT DOCUMENTS

| 2,973,403 A | 2/1961 | Taylor |
| 3,083,258 A | 3/1963 | Edwards et al. |

(Continued)

FOREIGN PATENT DOCUMENTS

| DE | 3730152 | 3/1989 |
| EP | 1754293 | 11/2005 |

OTHER PUBLICATIONS

AFL Telecommunications, ACA Conductor Accessories, Spacer Dampers with Elastomer Bushed Clamps—280000 Series specifications, Feb. 13, 2006 (3 pages).

(Continued)

*Primary Examiner* — Dhiru R Patel
(74) *Attorney, Agent, or Firm* — Michael Best & Friedrich, LLP

(57) ABSTRACT

A motion control device for an overhead utility transmission line includes a phase spacer and first and second spacer dampers connected to the phase spacer. The first spacer damper separates conductors of a first phase and the second spacer damper separates conductors of a second phase. The phase spacer separates the conductors of the first and second phases.

20 Claims, 3 Drawing Sheets

(58) Field of Classification Search
USPC .................................................. 174/40 R
See application file for complete search history.

(56) References Cited

U.S. PATENT DOCUMENTS

| | | | |
|---|---|---|---|
| 3,157,731 A | 11/1964 | Torr |
| 3,300,576 A | 1/1967 | Hendrix et al. |
| 3,475,544 A | 10/1969 | Reed |
| 3,585,277 A | 6/1971 | Lewis |
| 3,613,104 A | 10/1971 | Bradshaw |
| 3,617,609 A | 11/1971 | Tuttle |
| 3,777,046 A | 12/1973 | Schiavone |
| 3,806,627 A | 4/1974 | Harmon |
| 3,885,086 A | 5/1975 | Houston et al. |
| 3,904,811 A | 9/1975 | Otsuki et al. |
| 3,963,855 A | 6/1976 | Hawkins et al. |
| 3,965,286 A | 6/1976 | Smart |
| 3,978,276 A | 8/1976 | Poffenberger et al. |
| 4,113,979 A | 9/1978 | Torr et al. |
| 4,384,166 A | 5/1983 | Nigol et al. |
| 4,385,201 A | 5/1983 | Nigol et al. |
| 4,554,403 A | 11/1985 | Hearnshaw |
| 5,362,920 A | 11/1994 | Richardson, Jr. |
| 5,488,197 A | 1/1996 | Richardson, Jr. |
| 5,721,393 A | 2/1998 | Richardson, Jr. |
| 5,801,336 A | 9/1998 | Blanding |
| 6,008,453 A | 12/1999 | Richardson, Jr. |
| 6,143,980 A | 11/2000 | Blanding |
| 6,448,503 B1 | 9/2002 | McKinnon et al. |
| 7,692,100 B2 | 4/2010 | Boisclair |
| 8,981,227 B2 | 3/2015 | Richardson, Jr. |
| 2014/0124233 A1 | 5/2014 | Richardson, Jr. |
| 2014/0124234 A1 | 5/2014 | Richardson, Jr. |
| 2014/0144673 A1 | 5/2014 | Richardson, Jr. |
| 2014/0263870 A1 | 9/2014 | Smith |
| 2014/0311765 A1 | 10/2014 | Richardson, Jr. |
| 2015/0014050 A1 | 1/2015 | Tufari |
| 2015/0171610 A1 | 6/2015 | Richardson, Jr. |
| 2015/0229113 A1 | 8/2015 | Dobrinski et al. |

OTHER PUBLICATIONS

Preformed Line Products, Cushion-Grip Spacer Damper (Type B & Type C) brochure (2 pages).
Ribe Electrical Fittings, Online-Catalogue, B170/01 Interphase spacers, General, Jul. 11, 2006 (6 pages).
Ribe Electrical Fittings, Ribe Interphase Spacers—Protect Your Investment (6 pages).
Ribe Electrical Fittings, Ribe Spacer Dampers—Protect Your Investment (8 pages).
PCT/US2016/046020 International Search Report and Written Opinion dated Oct. 31, 2016 (13 pages).

MOTION CONTROL DEVICE FOR OVERHEAD TRANSMISSION LINES

FIELD

Various exemplary embodiments relate to motion control devices for power transmission lines.

BACKGROUND

Utility lines are used to transmit power from a generating facility to a distribution point. Typically, high voltage conductor lines are bundled over long distances to efficiently and economically transfer power and must be spaced from one another to avoid damage.

Damage to individual conductors in bundled electrical transmission lines may be caused by unwanted movement of the conductors. Typical types of conductor movement include short-wave or Aeolian vibrations, subspan or wake-induced oscillations, and long-wave vibrations or galloping. Motion in the conductors can lead to strain and stress on the conductors or the conductor support structures and damage can result from medium and high intensity short period events or low intensity continuous Aeolian vibrations. Flashover can also occur where two conductors of different phases come near each other or touch, leading to a power surge that triggers a circuit breaker. Such undesired motions may be induced by the wind, and may have longitudinal, transverse and vertical components. Suppressing and damping of these vibrations and oscillations requires a resilient connection between the conductors (both phase to phase and within a bundle) being spaced from one another while allowing a limited amount of flexing to occur.

The motion of the conductors in a bundle may also be caused by electrical power surges, which cause the conductors in a bundle to be attracted toward the center thereof. For example, in a bundle of three conductors defining, in cross section, a triangle, a surge causes the conductors to be attracted to a point at the center of the triangle. Similarly, in a bundle of four conductors defining, in cross section, a quadrilateral, a surge causes the conductors to be attracted to a point at the center of the quadrilateral.

SUMMARY

An exemplary method of controlling motion of utility lines includes providing a utility line motion control device having, a phase spacer having a first end, a second end, and an insulating member positioned between the first end and the second end, a first spacer damper having a first body connected to the first end of the phase spacer, a first clamp connected to the first body, and a second clamp connected to the first body, the first clamp at least partially defining a first opening and the second clamp at least partially defining a second opening, and a second spacer damper having a second body connected to the second end of the phase spacer, a third clamp connected to the second body, and a fourth clamp connected to the second body, the third clamp at least partially defining a third opening and the fourth clamp at least partially defining a fourth opening. A first conductor of a first phase is connected to the first clamp and a second conductor of the first phase is connected to the second clamp. A third conductor of a second phase is connected to the third clamp and a fourth conductor of the second phase is connected to the fourth clamp. The first spacer damper is electrically isolated from the second spacer damper by the phase spacer.

According to an exemplary embodiment, a utility line motion control device includes a phase spacer having a first end, a second end, and an insulating member positioned between the first end and the second end. A first spacer damper has a first body connected to the first end of the phase spacer. A first clamp is pivotally connected to the first body. A second clamp is pivotally connected to the first body. The first clamp at least partially defines a first opening for receiving a first overhead utility line conductor of a first phase and the second clamp at least partially defines a second opening for receiving a second overhead utility line conductor of the first phase. A second spacer damper has a second body connected to the second end of the phase spacer. A third clamp is pivotally connected to the second body. A fourth clamp is pivotally connected to the second body. The third clamp at least partially defines a third opening for receiving a third overhead utility line conductor of a second phase and the fourth clamp at least partially defines a fourth opening for receiving a fourth overhead utility line conductor of the second phase.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

It is important to prevent or avoid damage to power transmission lines caused from galloping, subspan, and/or Aeolian vibrations.

Figure 1:
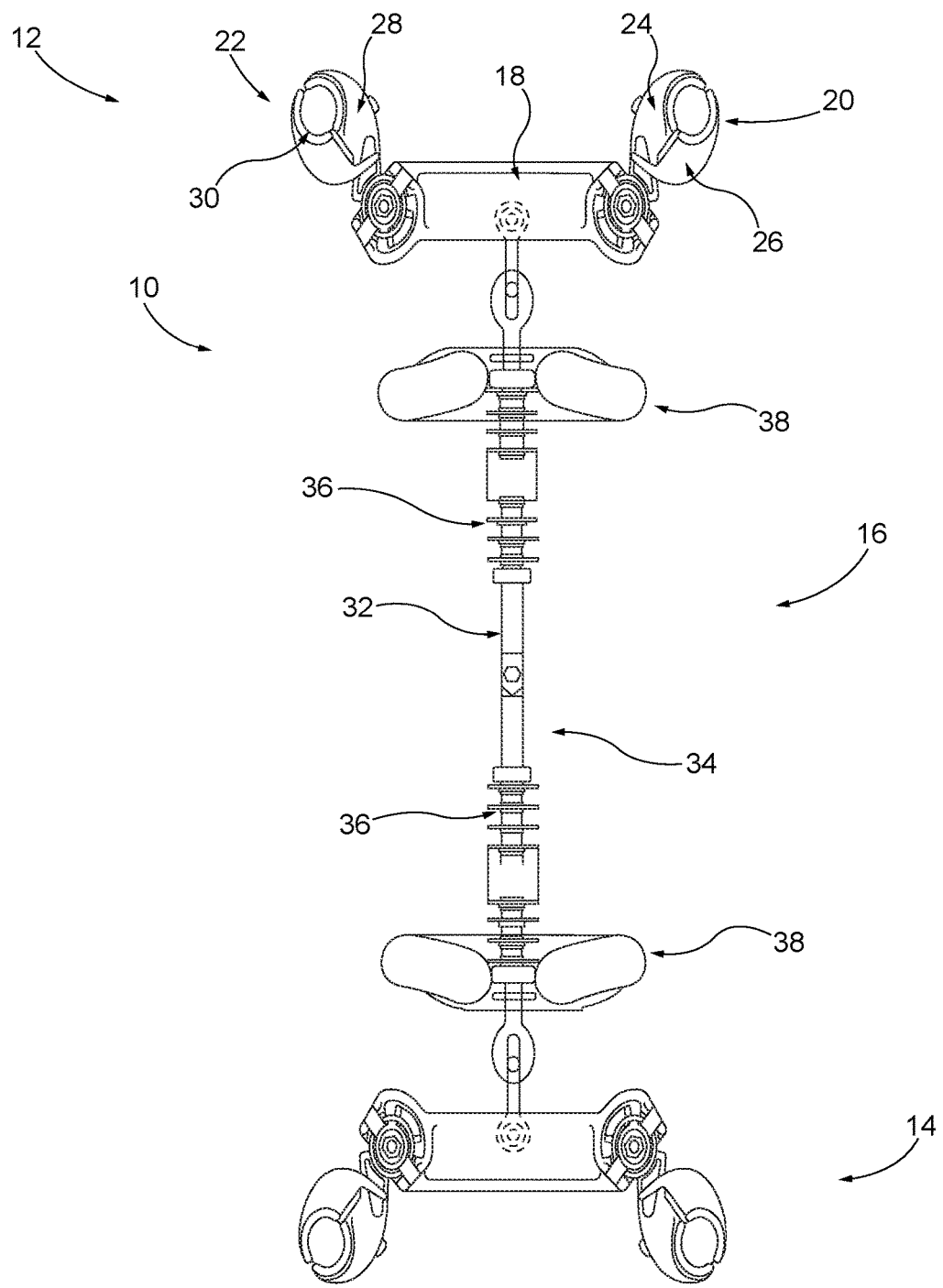
FIG. 1 is a top view of an exemplary motion control device
Figure 2:
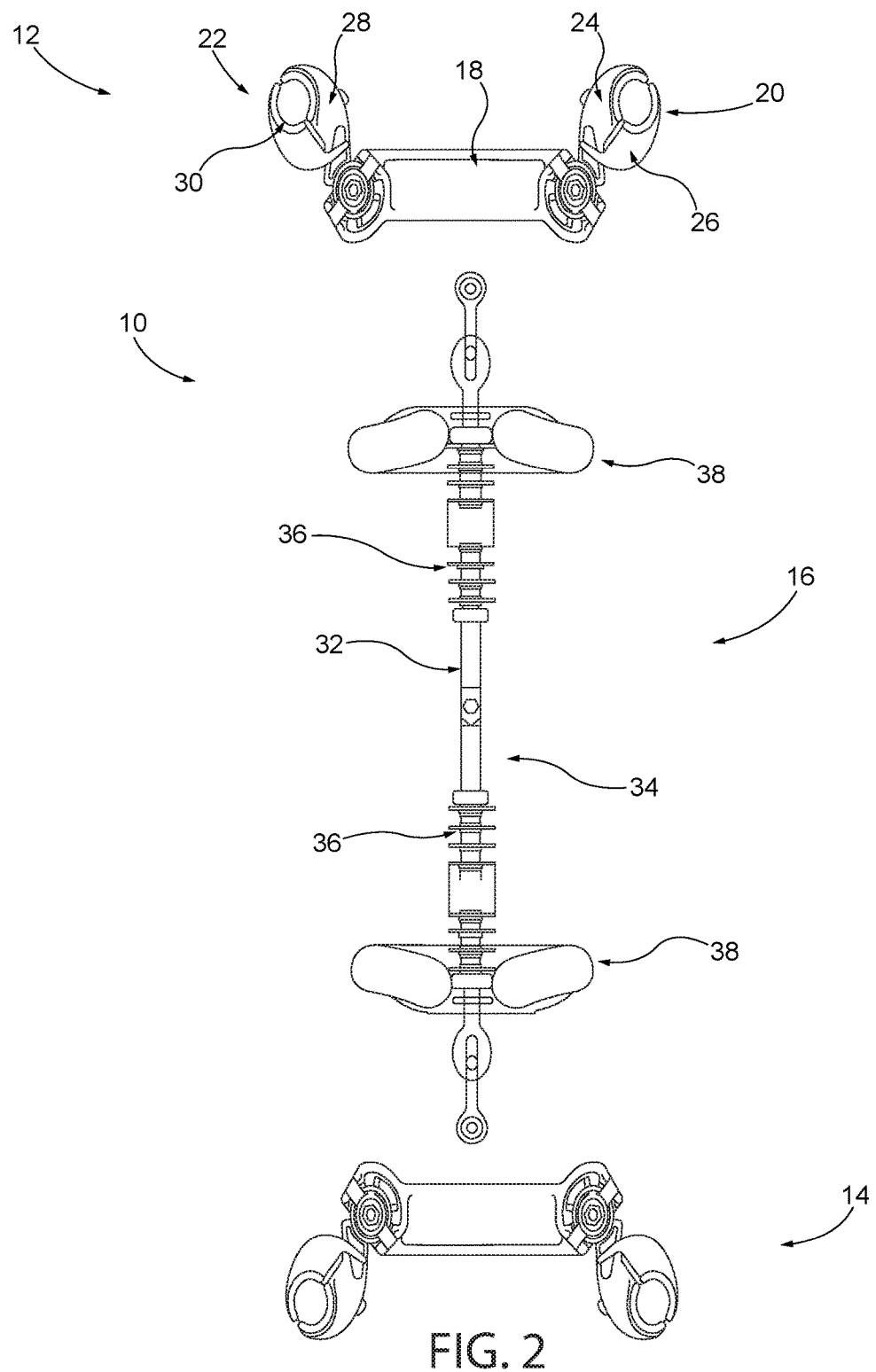
FIG. 2 is a partially exploded view of FIG. 1.
Figure 3:
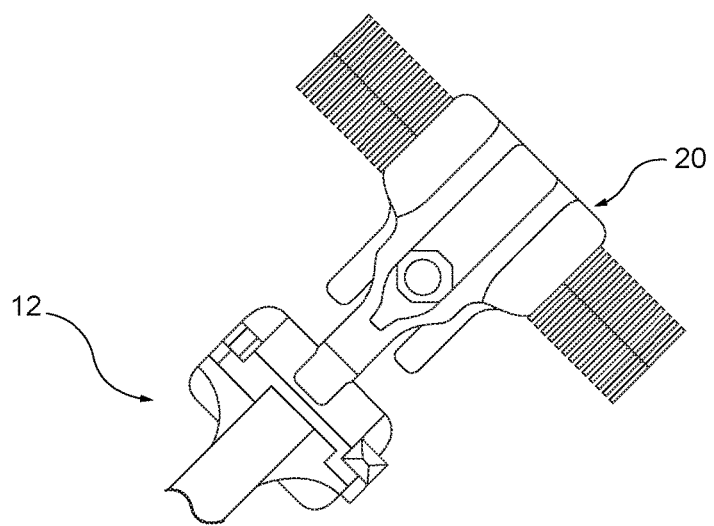
FIG. 3 is a partial cut-away view of a spacer of FIG. 1.
Figure 4:
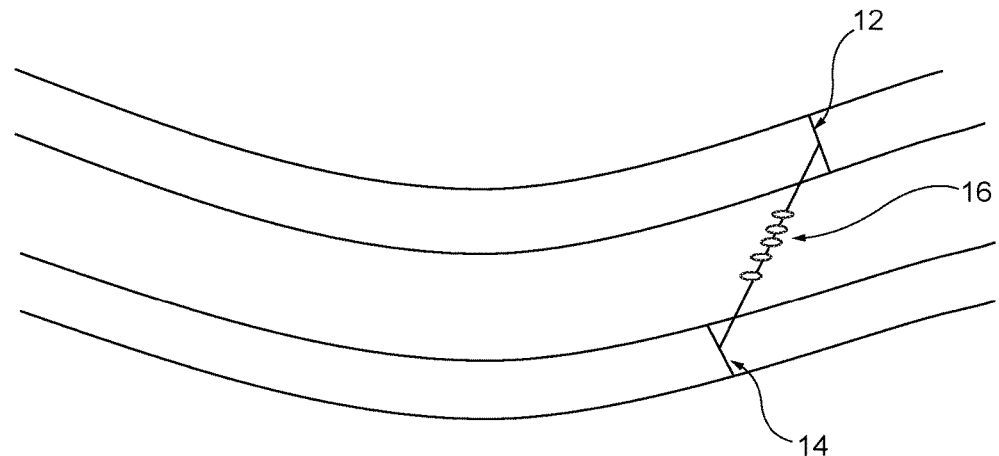
FIG. 4 is a schematic view of an overhead utility line with the exemplary motion control device installed.

FIG. 1 depicts an exemplary embodiment of a motion control device 10 that includes a first spacer 12, a second spacer 14, and a phase spacer 16 connected to the first and second spacers 12, 14. The connection between the phase spacer 16 and the first and second spacers 12, 14 can be fixed or rotatable. The first and second spacers 12, 14 can be rigid spacers or spacer dampers. According to various exemplary embodiments, the phase spacer 16 keeps apart two groups of conductors of different phases in a span of conductors and prevents the conductors from coming close enough to each other and causing a short circuit. The first and second spacers 12, 14 connect to conductors in each group or bundle, for example 2, 3, 4, or more conductors, to provide separation in the groups and can provide vibration dampening and/or subspan oscillation. Using the spacers 12, 14 and the phase spacer 16 can reduce strain on the conductors by suppressing and damping unwanted motion.

The first and second spacer dampers 12, 14 include a body 18, a first clamp 20, and a second clamp 22. The first clamp 20 is pivotally connected to a first end of the body 18 and the second clamp 22 is pivotally connected to a second end of the body 18. Each clamp 20, 22 includes an opening for receiving a conductor. The clamps 20, 22 can be connected to the body in a variety of manners as would be understood by one of ordinary skill in the art. The position, size, and spacing of the clamps 20, 22 and the body 18 may vary dependent on the application. Although two clamps 20, 22 are shown, the spacers can include more clamps to provide spacing for any number of conductors.

The clamps 20, 22 include a first jaw 24 and a second jaw 26 pivotally connected to the first jaw 24. The second jaw 26 is moveable with respect to the first jaw 24 from an open position to a closed position. The first and second jaws 24, 26 may be held in the closed position by a mechanical fastener 28 having a first portion and a second portion. In the exemplary embodiment shown, the first portion is a bolt and the second portion is a nut, although any suitable mechanical fastener may be used. The nut can be held captive in the first jaw 24 so that a user does not need to worry about the nut becoming dislodged. When the first and second jaws 24, 26 are in the closed position, the mechanical fastener 28 may be tightened to prevent movement of the jaws 24, 26 with respect to one another.

The first and second jaws 24, 26 include a clamping surface 30. The exemplary embodiment shows a curvilinear clamping surface 30 for clamping a cylindrical conductor. Various alternative embodiments may utilize a non-round configuration, for example an elliptical or polygonal configuration, to clamp different shaped conductors.

According to an exemplary embodiment, the first and second spacers 12, 14 can include an additional vibration damper feature. This damper feature helps to reduce vibrations in or between conductors. The damper feature includes resilient elements or materials used in the spacer damper. For example, an elastomeric material can be used on the clamping surfaces to help reduce vibrations. A vibration damper feature can alternatively, or additionally, be present at the connection between the clamp 20, 22 and the body 18. For example an elastomeric element can be positioned around or between each clamp 20, 22 and the body 18. The pivotal nature of the clamps 20, 22 with respect to the body 18 and the rigidity of the body 18 can also act as a damper feature.

According to an exemplary embodiment, the phase spacer 16 includes a first section 32 and a second section 34. The first and second sections 32, 34 can be adjustably connected to one another, such as a pivoting and/or linearly moveable connection. For example, an adjustable fastener can be used to connect the first and second sections 32, 34 and the fastener can be tightened to retain the first section 32 relative to the second section 34 once a desired position has been achieved. The first and second sections 32, 34 can also be integrally formed or fixedly attached. The first section 32 is connected to the first spacer 12 and the second section 34 is connected to the second spacer 14. In an exemplary embodiment, the connection between the phase spacer 16 and the first and second spacers 12, 14 can be a moveable connection, for example a pivoting or sliding connection either freely moveable or selectively moveable by a user. The connection can include a mechanical fastener or other suitable device or an integral connection.

In an exemplary embodiment, the first and second sections 32, 34 include portions having insulating material and may also include insulation members, for example a plurality of insulation fins 36. The inner portions of the phase spacer 16 and the insulation fins 36 can be made from materials including silicone, polymers, ceramics, elastomers, for example EDPM, fiberglass, or other non or low conductive insulating materials. The connection points of the phase spacer 16 near the first and second spacers 12, 14 can be made from a material that includes metal. In an exemplary embodiment, the phase spacer 16 can include a first and second ring 38. The rings 38 can be positioned at the transition points between the metal material and the insulating material where an electric field may be concentrated to prevent corona discharge.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present application, and are not intended to limit the structure of the exemplary embodiments of the present application to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A method of controlling motion of utility lines comprising:
    providing a utility line motion control device having,
        a phase spacer having a first end, a second end, and an insulating member positioned between the first end and the second end,
        a first spacer damper having a first body connected to the first end of the phase spacer, a first clamp pivotally connected to the first body, and a second clamp pivotally connected to the first body, the first clamp at least partially defining a first opening and the second clamp at least partially defining a second opening, and
        a second spacer damper having a second body connected to the second end of the phase spacer, a third clamp pivotally connected to the second body, and a fourth clamp pivotally connected to the second body, the third clamp at least partially defining a third opening and the fourth clamp at least partially defining a fourth opening,
    connecting a first conductor of a first phase to the first clamp and a second conductor of the first phase to the second clamp; and
    connecting a third conductor of a second phase to the third clamp and a fourth conductor of the second phase to the fourth clamp,
    wherein the first spacer damper is electrically isolated from the second spacer damper by the phase spacer.

2. The method of claim 1, further comprising pivotally adjusting the first clamp and the second clamp relative to the first body.

3. The method of claim 1, wherein the first clamp includes a first jaw moveably connected to a second jaw, and connecting the first conductor to the first clamp includes engaging the first conductor with the second jaw and moving the first jaw to engage the first conductor.

4. The method of claim 3, further comprising securing the first jaw relative to the second jaw with a fastener.

5. The method of claim 1, wherein the phase spacer includes a first section moveably connected to the second section by a fastener.

6. The method of claim 5, further comprising moving the first section of the phase spacer relative to the second section and tightening the fastener to retain the position of the first section relative to the second section.

7. The method of claim 1, wherein the insulating member includes an insulating fin.

8. The method of claim 7, wherein the phase spacer includes a corona ring.

9. The method of claim 1, further comprising spacing the first spacer damper laterally from the second spacer damper so that the phase spacer extends at an oblique angle relative to the first spacer damper and the second spacer damper.

10. A utility line motion control device comprising:
a phase spacer having a first end, a second end, and an insulating member positioned between the first end and the second end;
a first spacer damper having a first body connected to the first end of the phase spacer, a first clamp pivotally connected to the first body, and a second clamp pivotally connected to the first body, the first clamp at least partially defining a first opening for receiving a first overhead utility line conductor of a first phase and the second clamp at least partially defining a second opening for receiving a second overhead utility line conductor of the first phase; and
a second spacer damper having a second body connected to the second end of the phase spacer, a third clamp pivotally connected to the second body, and a fourth clamp pivotally connected to the second body, the third clamp at least partially defining a third opening for receiving a third overhead utility line conductor of a second phase and the fourth clamp at least partially defining a fourth opening for receiving a fourth overhead utility line conductor of the second phase.

11. The utility line motion control device of claim 10, wherein the first clamp includes a first jaw moveably connected to a second jaw.

12. The utility line motion control device of claim 11, wherein a fastener secures the first jaw relative to the second jaw.

13. The utility line motion control device of claim 10, wherein the first and second spacers are moveably connected to the phase spacer.

14. The utility line motion control device of claim 10, wherein the first and second spacers include a vibration damper feature.

15. The utility line motion control device of claim 10, wherein the phase spacer includes a first section and a second section.

16. The utility line motion control device of claim 15, wherein the first section is moveably connected to the second section.

17. The utility line motion control device of claim 16, wherein the first section is pivotally connected to the first section.

18. The utility line motion control device of claim 16, wherein a fastener releasable retains the position of the first section relative to the second section.

19. The utility line motion control device of claim 10, wherein the insulating member includes an insulating fin.

20. The utility line motion control device of claim 10, wherein the phase spacer includes a corona ring.

* * * * *